United States

Inuiya

4,180,313

Dec. 25, 1979

[54] STEREOSCOPIC CAMERA

[75] Inventor: Masafumi Inuiya, Asaka, Japan

[73] Assignee: Fuji Photo Film Co., Ltd., Minami-ashigara, Japan

[21] Appl. No.: 884,354

[22] Filed: Mar. 7, 1978

[30] Foreign Application Priority Data

Mar. 11, 1977 [JP] Japan ................................. 52-26755

[51] Int. Cl.² ....................... G03B 35/00; G02B 17/00
[52] U.S. Cl. .................................... 354/112; 350/204
[58] Field of Search ............... 354/112, 115, 122, 125; 350/203, 204; 352/65

[56] References Cited

U.S. PATENT DOCUMENTS

| 1,749,278 | 3/1930 | Frederick | 350/204 |
|---|---|---|---|
| 2,602,385 | 7/1952 | Bonnet | 354/112 X |
| 3,535,993 | 10/1970 | Jones | 354/112 |
| 3,675,553 | 7/1972 | Dudley | 354/112 |

OTHER PUBLICATIONS

H. E. Ives, A Camera for Making Parallax Panoramagrams, Journal of the Optical Society of America, Dec. 1928, pp. 435-439.
H. E. Ives, Motion Pictures in Relief, Journal of the Optical Society of America, Feb. 1929, pp. 118-122.
H. E. Ives, Parallax Panoramagrams made with a Large Diameter Lens, Journal of the Optical Society of America, Jun. 1930, pp. 332-342.
H. E. Ives, Parallax Panoramagrams made with a Large Diameter Concave Mirror, Journal of the Optical Society of America, Nov. 1930, pp. 597-600.
H. E. Ives, Optical Properties of a Lippmann Lenticular Sheet, Journal of the Optical Society of America, Mar. 1931, pp. 171-176.

*Primary Examiner*—L. T. Hix
*Assistant Examiner*—Thomas H. Tarcza
*Attorney, Agent, or Firm*—Gerald J. Ferguson, Jr.; Joseph J. Baker

[57] ABSTRACT

A stereoscopic camera for taking a stereoscopic picture of a three dimensional object on a photographic film carrying a lenticular film. The camera has a positive objective having a focal length as long as 1.0 to 4.0 m. An image inverting optical element consisting of a number of dove prisms arranged in parallel and light intercepting plates interposed between the dove prisms is located immediately behind the positive objective for right-left inversion of the image. A taking lens is located immediately behind the image inverting optical element for focusing an image in the camera in the vicinity of the photographic film. In a preferred embodiment of the invention, a field lens of a focal length equal to or longer than that of the taking lens is located immediately in front of the photographic film.

4 Claims, 4 Drawing Figures

STEREOSCOPIC CAMERA

BACKGROUND OF THE INVENTION

1. Field of the Invention

This invention relates to a stereoscopic camera, and more particularly to a camera for taking a stereoscopic picture of a three dimensional object on a photosensitive material by only one exposure. The photosensitive material is provided thereon with a lenticular film or a multi-slit film.

2. Description of the Prior Art

It has been known in the art to record a stereoscopic picture on a photosensitive material such as a photographic negative film provided thereon with a lenticular film or a multi-slit film. A lenticular film consists of a number of fine cylindrical lenses combined in parallel and a multi-slit film consists of a number of fine slits arranged in parallel at very small equal intervals. Since these two types of film provided on the photosensitive film are both well known in the art and have the same function in the present invention, the present invention will be described only in relation to the lenticular film which should be understood as a representative of the two types of film.

There have been known various kinds of stereoscopic camera. Among them is a camera capable of taking a stereoscopic picture in a single exposure as disclosed in the Journal of the Optical Society of America of 1928 to 1930 by H. E. Ives. As described in this Journal, this type of camera can be constructed with either a movable lens or a fixed lens. In either case, it is desirable that the camera be of simple structure and compact for easy handling. Further, it is of course desirable that the camera have high performance so as to make it possible to obtain a picture having exceptionally good stereoscopic effect. In addition, it is also desirable that the camera have a wide angle of view.

SUMMARY OF THE INVENTION

It is therefore the primary object of the present invention to provide a stereoscopic camera which is capable of taking a stereoscopic picture in a single exposure and has a high performance.

A specific object of the present invention is to provide a stereoscopic camera capable of taking a picture having exceptionally good stereoscopic effect.

Another specific object of the present invention is to provide a stereoscopic camera which has a wide angle of stereoscopic view.

Still another object of the present invention is to provide a stereoscopic camera of simple structure and compact size.

A further object of the present invention is to provide a stereoscopic camera which is easy to handle.

The above objects of the present invention are accomplished by providing a stereoscopic camera comprising a long focal length positive lens having a focal length of as long as 1.0 to 4.0 m, an image inverting optical means located immediately behind the positive lens comprising a number of vertically extending inversion optical elements arranged in a vertical plane with the optical axes thereof oriented in parallel for right-left invertion of an image, a taking lens for focusing an image of an object of the camera, and means for supporting a photosensitive material at a position behind and separated from said taking lens by a distance substantially equal to the focal length of the taking lens.

The inversion optical elements have a right-left inversion effect but do not converge or diverge the light incident thereto. When parallel light rays are incident to the inversion optical elements, parallel right rays emanate therefrom. The photosensitive material is provided thereon with a lenticular film consisting of a number of vertically extending cylindrical lens elements arranged in parallel. In accordance with a preferred embodiment of the present invention, a field lens having the same focal length as that of the taking lens is provided immediately in front of the photosensitive film.

The focal length of the positive lens should preferably be within the range of 1.5 to 3.0 m. As the inversion optical elements can be used a set of dove prisms or Porro prisms. Dove prisms are preferably employed in this invention. The image inverting optical means consists of a number of inversion optical elements and a number of light intercepting plates provided between the adjacent optical elements. The positive lens, the image inverting optical means and the taking lens are located close to each other, and the positive lens and the taking lens have almost the same diameter. Further, the size of the field lens is not to be smaller than that of the lenticular film. The direction in which the inversion optical elements extend is parallel to the direction in which the cylindrical lens elements of the lenticular lens extend, and is oriented vertically when the camera is used to take a stereoscopic picture.

DESCRIPTION OF THE PREFERRED EMBODIMENT

Figure 1:
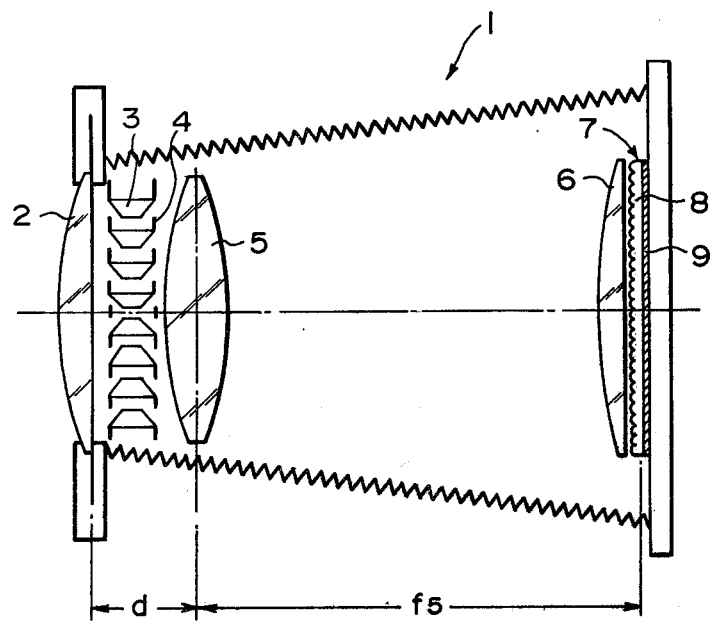
FIG. 1 is a horizontal sectional view showing the structure of an embodiment of a stereoscopic camera in accordance with the present invention.

Now a preferred embodiment of the present invention will be described in detail with reference to FIG. 1. In FIG. 1, various mechanical elements necessary for taking pictures such as a shutter mechanism and a film driving mechanism are omitted for the sake of simplicity and convenience for description of the invention. Means for supporting optical elements are also omitted.

The optical system employed in the camera 1 comprises a positive objective 2, an image inverting optical means 3 comprising a group of dove prisms arranged in parallel located immediately therebehind, a taking lens 5 located immediately behind the group of dove prisms 3, and a field lens 6 located behind and apart from the taking lens 5. A number of light intercepting plates 4 are interposed between adjacent dove prisms. The distance between the taking lens 5 and the field lens 6 is substantially equal to the focal length of the taking lens 5. The focal length of the field lens 6 is equal to or longer than (twice to four times as long as) the focal length of the taking lens 5.

Immediately behind the field lens 6 is provided a photosensitive material 7 consisting of a photosensitive film 9 and a lenticular film 8 attached thereon. The lenticular film 8 may be integrally fixed to the photosensitive film 9 or be removably attached thereon. The lenticular film 8 may be of any type insofar as it is superposed on the photosensitive film 9 when the picture is taken and is again superposed on the photosensitive film 9 after exposure and development thereof at precisely the same relative position with respect to the film 9. The photosensitive film 9 may be of reversal (positive) type or negative type.

Now the process for taking a picture of an object by the camera 1 will be described. Assuming that an object at a distance of a from the camera 1 is photographed and the image of the object is focused by the positive objective 2 at a distance of b from the objective 2, the relation between these distances a and b and the focal length $f_2$ of the positive objective 2 is represented by the following formula.

$$1/a + 1/b = 1/f_2 \qquad (1)$$

However, in the camera of this invention as shown in FIG. 1, the light passing through the objective 2 is deflected by the image inverting optical means 3 and the light which has passed through the image inverting optical means 3 behaves as if the light were emitted from an object located in front of the camera 1 at a distance of b from the positive objective 2. The light having passed through the image converting optical means 3 comprising a group of dove prisms is then focused by the taking lens 5 at a distance of c from the taking lens 5. Assuming that the distance between the positive objective 2 and the taking lens 5 is d, the relation between the distance of the imaginary object from the taking lens 5, the distance from the taking lens 5 of the image focused thereby and the focal length $f_5$ of the taking lens 5 is represented by the following formula.

$$1/(b+d) + 1/c = 1/f_5 \qquad (2)$$

Since the distance d is much smaller than the distance b, the above formula can be approximately rewritten as follows.

$$1/b + 1/c = 1/f_5 \qquad (3)$$

Now assuming that the distance of the image focused by the taking lens 5 from the lenticular film 8 is x, the distance x can be represented by the following formula. It should be noted that the difference in x between different parts of the image of the object gives the stereoscopic effect.

$$x = f_5 - c = f_5 - \frac{1}{\frac{1}{a} + \frac{1}{f_5} - \frac{1}{f_2}} = \frac{f_5^2(f_2 - a)}{f_2 f_5 + a(f_2 - f_5)} \qquad (4)$$

Substituting $f_2 = 2$ m and $f_5 = 135$ mm into the above formula (4), for instance, the value of x as follows is obtained.

$x = -9.8$ mm when $a =$ infinity
$x = -4.7$ mm when $a = 4$ m
$x = 0$ mm when $a = 2$ m
$x = 8.5$ mm when $a = 1$ m This means that an object having its different parts distributed over a range of 1 m to infinity from the camera 1 is converted to an image focused in a range of ±8 mm from the lenticular film 8. Consequently, the stereoscopic image of the object obtained by the stereoscopic camera in accordance with this embodiment of the invention is observed in a range of ±10 mm from the lenticular film 8. By selecting the focal length of the positive objective 2 within the range of 1.0 to 4.0 m, more preferably 1.5 to 3.0 m, corresponding to the distance at which the human figure and most other objects are generally photographed, the image of the object is focused in the vicinity of the lenticular film 8 and the stereoscopic image of the object is reproduced in a range extending from slightly in front of to slightly behind the photosensitive material 7. It is known that the smaller the distance of the reproduced image is from the lenticular film, the sharper the image appears to the observer. In accordance with the stereoscopic camera of this invention, an object distributed over a range of about 1 m to infinity from the camera is reproduced as an image in a narrow range extending from slightly in front of to slightly behind the lenticular film. Therefore, the object is sharply reproduced in a stereoscopic image.

The diameter of the taking lens 5, the focal length of the taking lens and the angle of view of each cylindrical lens element of the lenticular film 8 should have the following relation in order that the picture elements recorded through adjacent cylindrical lens elements of the lenticular film 8 are not overlapped or doubled with each other.

$$D \leq 2f_5 \tan(2\theta/2) \qquad (5)$$

The above formula (5) means that the diameter D of the taking lens 5 is included in the range of the angle of view $2\theta$ of a cylindrical lens element at the center of the lenticular film 8. The relation is preferably that expressed by the equality sign in the formula (5). In order to enable the camera to take stereoscopic pictures with different photosensitive materials with lenticular films of different angles of view, the diameter of the taking lens is desired to be variable by use of a diaphragm or the like which is capable of varying the horizontal diameter of the taking lens 5.

Figure 2:
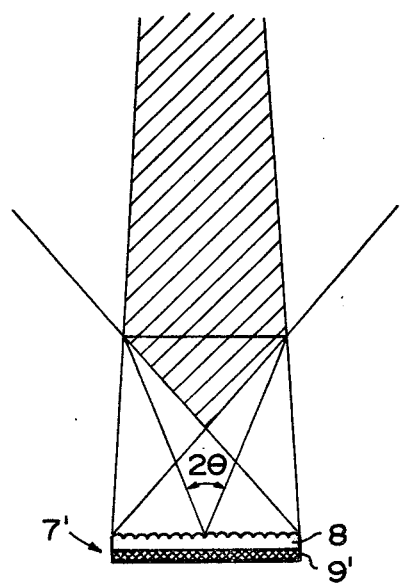
FIG. 2 is an explanatory view which shows the angle of stereoscopic view in an embodiment of the stereoscopic camera in accordance with the present invention.
Figure 3:
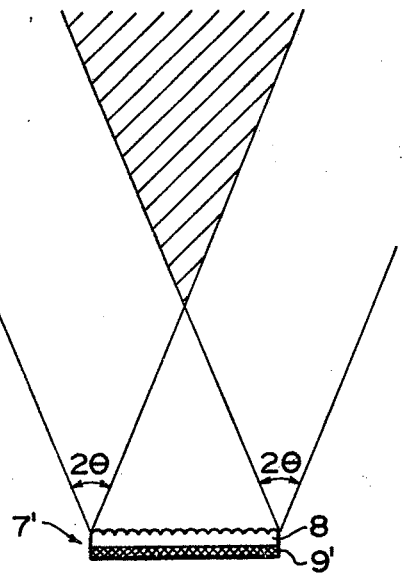
FIG. 3 is an explanatory view which shows the angle of stereoscopic view in another embodiment of the stereoscopic camera of the present invention.

In the preferred embodiment of the present invention, the field lens 6 is provided in front of the photosensitive material 7 as shown in FIG. 1. The camera with the field lens 6 in accordance with this embodiment is capable of taking a stereoscopic picture that has a wide angle of view when reproduced. The size of the field lens 6 is not smaller than that of the photosensitive material 7, and the focal length thereof is equal to that of the taking lens 5. Without the field lens 6, the region in which an observer viewing the photosensitive material 7' having a developed photosensitive film 9' can see a stereoscopic image is limited to the range indicated by hatching in FIG. 2. When the field lens 6 is used, the region in which the stereoscopic image can be observed is as shown by hatching in FIG. 3. This is because the light beams incident to different cylindrical lens elements from a given point of the taking lens 5 are collimated by the field lens 6 having the same focal length as that of the taking lens 5. That is, all the light beams passing through a given point of the taking lens 5 are made to advance in parallel after they have passed through the field lens 6 and the light beams incident to the same cylindrical lens element of the lenticular film 8 from the opposite ends of the taking lens 5 have an angle equal to the angle of view $2\theta$ of the cylindrical lens element. Consequently, the reproduction light from the lenticular film 8 has an angle of divergence of $2\theta$ from all positions thereof. Therefore, a stereoscopic image can be observed by locating both eyes in the region indicated by hatching in FIG. 3. FIG. 3 shows that the region in which the stereoscopic image can be observed from the photosensitive material 7' is enlarged as it goes apart from the photosensitive material 7'.

It should be noted, however, that the focal length of the field lens 6 may not be equal to that of the taking lens 5. Even when the focal length of the field lens 6 is longer than the focal length of the taking lens 5, the obtained results become equivalent to those which would be obtained in case that a taking lens of a longer focal length and the same angle of view is employed. Therefore, when the focal length of the field lens 6 is twice as long as that of the taking lens 5, the region from which the stereoscopic image can be observed becomes as shown by hatching in FIG. 4. The result shown in FIG. 4 is equivalent to that which would be obtained when the iris of the taking lens 5 is located at a distance twice as long as the actual distance.

Figure 4:
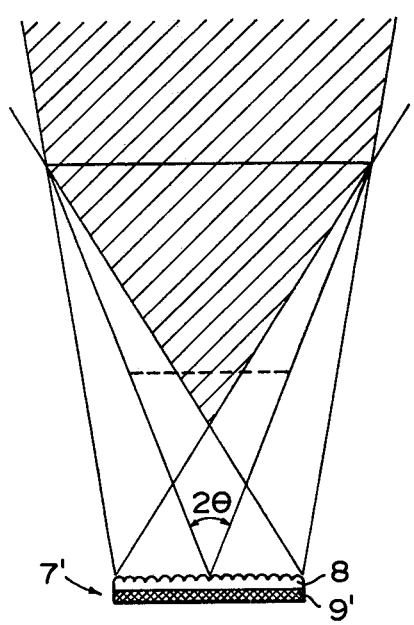
FIG. 4 is an explanatory view which shows the angle of stereoscopic view in still another embodiment of the stereoscopic camera of the present invention.

When the observer is at the least distance of distinct vision from the lenticular film 8, there is a possibility that the region from which a stereoscopic view can be observed in FIG. 4 become larger than that in FIG. 3.

I claim:

1. A stereoscopic camera for taking a picture of a three dimensional object on a photosensitive material having a lenticular film thereon, said camera comprising a positive objective having a focal length of 1.0 to 4.0 m, an image inverting optical means located immediately behind the positive objective for inverting an image with respect to right and left, a taking lens located immediately behind the image inverting optical means for focusing an image of an object of the camera, means for supporting a photosensitive material at a position separated from said taking lens therebehind by a distance equal to the focal length of the taking lens and a field lens located immediately in front of said photosensitive material supporting means so that the field lens is located in front of the photosensitive material, said field lens having a focal length equal to or longer than that of said taking lens.

2. A stereoscopic camera as claimed in claim 1 wherein the focal length of said positive objective is 1.5 to 3.0 m.

3. A stereoscopic camera as claimed in claim 1 wherein said image inverting optical means is a group of dove prisms arranged with the optical axes thereof oriented in parallel with each other and with cylindrical lens elements of said lenticular film.

4. A stereoscopic camera as claimed in claim 3 wherein said image inverting optical means further comprises a number of light intercepting means located between adjacent dove prisms.

* * * * *